United States Patent
Kozuka

(10) Patent No.: US 11,772,314 B2
(45) Date of Patent: Oct. 3, 2023

(54) TEMPERATURE CONTROL DEVICE FOR INJECTION MOLDING MACHINE

(71) Applicant: NISSEI PLASTIC INDUSTRIAL CO., LTD., Nagano (JP)

(72) Inventor: Makoto Kozuka, Hanishina-gun (JP)

(73) Assignee: NISSEI PLASTIC INDUSTRIAL CO., LTD., Nagano-Ken (JP)

( * ) Notice: Subject to any disclaimer, the term of this patent is extended or adjusted under 35 U.S.C. 154(b) by 0 days.

(21) Appl. No.: 16/977,005

(22) PCT Filed: Mar. 13, 2019

(86) PCT No.: PCT/JP2019/010321
§ 371 (c)(1),
(2) Date: Aug. 31, 2020

(87) PCT Pub. No.: WO2019/177040
PCT Pub. Date: Sep. 19, 2019

(65) Prior Publication Data
US 2021/0001529 A1    Jan. 7, 2021

(30) Foreign Application Priority Data

Mar. 14, 2018    (JP) ................. 2018-046185

(51) Int. Cl.
*B29C 45/78*    (2006.01)
*B29C 45/74*    (2006.01)
*B29C 45/62*    (2006.01)

(52) U.S. Cl.
CPC .............. *B29C 45/78* (2013.01); *B29C 45/74* (2013.01); *B29C 45/62* (2013.01); *B29C 2945/7604* (2013.01); *B29C 2945/76568* (2013.01)

(58) Field of Classification Search
CPC ......... B29C 45/78; B29C 45/74; B29C 45/62; B29C 2945/7604; B29C 2945/76568
See application file for complete search history.

(56) References Cited

U.S. PATENT DOCUMENTS 4,480,981 A * 11/1984 Togawa ................. B29C 48/92
425/143
5,456,870 A * 10/1995 Bulgrin .................. B29C 45/76
264/211.21

(Continued)

FOREIGN PATENT DOCUMENTS

JP        6-55600 A     3/1994
JP       10-34725 A     2/1998

(Continued)

OTHER PUBLICATIONS

International Search Report issued in PCT/JP2019/010321 (PCT/ISA/210), dated May 28, 2019.

*Primary Examiner* — Galen H Hauth
(74) *Attorney, Agent, or Firm* — Birch, Stewart, Kolasch & Birch, LLP

(57) ABSTRACT

A detector attachment unit is provided that has at least two or more mounting hole sections for which the temperature detector is detachably attached to the outer surface of the heating cylinder and the temperature detector can be attached at different selected positions in at least the axial direction of the heating cylinder. The temperature control system includes an inner wall face temperature conversion function unit to perform conversion processing to convert the heating temperature detected by the temperature detector to the inner wall face temperature of the heating cylinder, and an inner wall face temperature display function unit to perform at least display processing on the inner wall face temperature obtained by this inner wall face temperature conversion function unit.

7 Claims, 8 Drawing Sheets

(56) References Cited

U.S. PATENT DOCUMENTS

| | | | | |
|---|---|---|---|---|
| 5,470,218 A | * | 11/1995 | Hillman | ................ B29C 45/768 |
| | | | | 425/149 |
| 6,104,006 A | * | 8/2000 | Kimura | .................. B29C 45/74 |
| | | | | 219/422 |
| 2006/0141092 A1 | | 6/2006 | Onishi | |

FOREIGN PATENT DOCUMENTS

| JP | 2009-126112 A | 6/2009 |
|---|---|---|
| JP | 2012-148480 A | 8/2012 |
| WO | WO 2005/021237 A1 | 3/2005 |

* cited by examiner (INNER WALL FACE TEMPERATURE)

TEMPERATURE CONTROL DEVICE FOR INJECTION MOLDING MACHINE

TECHNICAL FIELD

The present invention relates to a temperature control device of an injection molding machine preferred for the heating control of a heating cylinder so as to provide a predetermined inner wall temperature.

BACKGROUND ART

Generally, an injection molding machine performs a molding operation by injecting plasticized molten resin with a screw to fill a metal mold with the resin. Thus, whether the molten resin can be maintained to have an appropriate molten state is an important factor to secure a desired molding quality. To realize this, a plurality of heating units are generally provided at different zone positions of an outer surface in an axial direction of a heating cylinder including a screw therein, and a plurality of temperature detectors are provided at different zone positions in the axial direction of the heating cylinder to thereby constitute a temperature control system. The injection molding machine includes a temperature control device that provides a heating control so as to provide a predetermined temperature distribution in the axial direction of the heating cylinder.

Conventionally, known temperature control devices as described above include the heating cylinder temperature control device disclosed in Patent Publication 1 and the temperature display device including a temperature control device disclosed in Patent Publication 2. The temperature control device disclosed in Patent Publication 1 has a purpose of providing a temperature control by selecting a temperature control unit depending on the characteristic of a material resin, and in particular has a purpose of achieving both a molding operation having a general molding cycle time, and a molding operation having a short molding cycle time. Specifically, a feed zone has temperature control units at a plurality of positions in the cylinder direction among which one temperature control unit is selected as required to provide a control to thereby perform a different temperature control.

The temperature control device (temperature display device) disclosed in Patent Publication 2 has a purpose of accurately grasping the resin temperature and/or behavior in the cylinder. Specifically, this temperature control device has a plurality of temperature sensors provided in a heating cylinder and a display device for displaying the temperatures detected by the temperature sensors. This display device is configured to simultaneously display a set temperature at a control point of the heating cylinder and the inner wall temperature of the heating cylinder detected by the temperature sensors in a graph having one axis showing a position along the longitudinal direction of the heating cylinder and the other axis showing the temperature.

PRIOR ART PUBLICATIONS

Patent Publications

Patent Literature 1: Japanese Unexamined Patent Application Publication No. H10-34725
Patent Literature 2: Japanese Unexamined Patent Application Publication No. 2009-126112

DISCLOSURE OF THE INVENTION

Problem to be Solved by the Invention

However, the above-described conventional temperature control device provided in the injection molding machine has disadvantages as described below.

First, the temperature detector is attached to the heating cylinder by an attachment structure in which a mounting hole section is formed in a direction from the outer surface of the heating cylinder to the center. This mounting hole section has an attachment structure to receive the inserted temperature detector. Thus, a heating cylinder temperature is basically obtained between the inner wall face and the outer surface of the heating cylinder. This heating cylinder temperature is not obtained by detecting an intrinsic resin temperature. Thus, this heating cylinder temperature has a disadvantage in that this heating cylinder temperature has a considerable divergence from an optimal temperature distribution in regards to the resin temperature depending on the characteristic pattern gradient of the temperature distribution and/or an external temperature environment, for example. Tus, there has been a room for further improvement from the viewpoint of the accurate recognition of the intrinsic heating temperature (inner wall face temperature) and temperature distribution (inner wall face temperature distribution) to plasticize and melt resin.

Secondly, the temperature distribution in the axial direction of the heating cylinder can be changed (or adjusted) by changing the setting of the magnitude of the set temperature relative to the heating temperature of each zone. However, the temperature detector has a fixed attachment position (control point position). Thus, although a certain change (adjustment) is possible, there is a limit in ensuring the characteristic pattern related to a desired and appropriate temperature distribution, thus additionally causing room for further improvement.

It is an objective of the present invention to provide a temperature control device for an injection molding machine for which the problem of the background art as described above is solved.

Means for Solving the Problem

In order to solve the above-described problem, a temperature control device 1 for an injection molding machine according to the present invention is configured to include: a heating unit 4a . . . attached to an outer surface 3f of a heating cylinder 3 including a screw 2, a temperature detector 6a . . . attached to a detector attachment unit 5a . . . provided in the heating cylinder 3, and a temperature control system 7 to control the heating unit 4a . . . based on the heating temperature Twa . . . detected by the temperature detector 6a . . . so as to provide a predetermined inner wall face temperature Tia . . . . The temperature control device 1 includes the detector attachment unit 5a . . . for which the temperature detector 6a . . . is detachably attached to the outer surface 3f of the heating cylinder 3 and for which at least two or more mounting hole sections 5af, 5am, 5ar . . . are provided that can be attached with the temperature detector 6a . . . by selecting at least a different position in the axial direction Fs of the heating cylinder 3. The temperature control device is characterized by comprising: an inner wall face temperature conversion function unit Ec to perform conversion processing to convert, for the temperature control system 7, a heating temperature Twa . . . detected by the temperature detector 6a . . . to an inner wall face temperature Tia . . . of the heating cylinder 3; and an inner wall face temperature display function unit Ed to perform at least display processing on the inner wall face temperature Tia . . . obtained by this the inner wall face temperature conversion function unit Ec.

In this case, according to a preferred embodiment of the invention, the heating units 4a and 4b . . . can be provided at a plurality of different positions of the outer surface 3f in the axial direction Fs of the heating cylinder 3. The detector attachment units 5a and 5b . . . can be provided at a plurality of different positions in the axial direction Fs of the heating cylinder 3 and/or a circumferential direction Ff. The temperature control system 7 can have an inner wall face temperature distribution calculation function unit Et that calculates, based on the inner wall face temperatures Tia and Tib . . . at a plurality of positions obtained by the inner wall face temperature conversion function unit Ec, the inner wall face temperature distribution At at the inner wall face 3i in the axial direction Fs by calculation processing. The inner wall face temperature display function unit Ed can have a display processing function to display the inner wall face temperature distribution At calculated by the inner wall face temperature distribution calculation function unit Et. On the other hand, the detector attachment units 5a and 5b . . . can include at least two or more mounting hole sections 5af, 5ap, and 5aq . . . to which temperature detectors 6a and 6b . . . can be attached at different selected attachment depths. The heating units 4a and 4b . . . can use band heaters wound along the outer surface 3f of the heating cylinder 3. The temperature detectors 6a and 6b . . . can use a temperature sensor formed to have a bar-like configuration by a thermocouple. On the other hand, the inner wall face temperature conversion function unit Ec can perform conversion processing to convert the detected heating temperatures Twa . . . and Twb . . . to the inner wall face temperatures Tia . . . and Tib . . . by using the calculation formulae [formula 101], [formula 102], and [formula 103] based on data regarding the length in the axial direction Fs of the heating units 4a and 4b . . . , the control point positions Xwa . . . and Xwb . . . of the heating cylinder 3, and the shape and material of the heating cylinder 3. The inner wall face temperature distribution calculation function unit Et can have a control point position calculation function Etp to calculate the optimal control point positions Xwa . . . and Xwb . . . based on data regarding the calculation formulae [formula 101], [formula 102], and [formula 103], as well as the inner wall face temperatures Tia . . . and Tib . . . and the inner wall face temperature distribution At. Furthermore, the inner wall face temperature display function unit Ed is configured so that a temperature display unit 8 can have a temperature distribution display function Edt to graphically display the inner wall face temperature distribution At and the temperature display unit 8 can have a detector position display function Edx to display the attachment positions of the temperature detectors 6a and 6b . . . while being related to the inner wall face temperature distribution At.

Effects of the Invention

Remarkable effects as shown below are provided by the temperature control device 1 of the injection molding machine according to the present invention as described above.

(1) The temperature control system 7 has the inner wall face temperature conversion function unit Ec to perform the conversion processing to convert the heating temperature Twa . . . detected by the temperature detector 6a . . . to the inner wall face temperature Tia . . . of the heating cylinder 3 and the inner wall face temperature display function unit Ed to perform at least display processing on the inner wall face temperature Tia . . . obtained by the inner wall face temperature conversion function unit Ec. Thus, even when the detected temperature is the heating temperature Twa . . . between the inner wall face 3i and the outer surface 3f of the heating cylinder 3, the temperature of the inner wall face 3i abutted to the resin in the heating cylinder 3 (inner wall face temperature Tia . . . ) can be grasped in a timely manner and the attachment structure of the temperature detector 6a . . . can be obtained in a simple and low-cost manner without requiring a significant change.

(2) The outer surface 3f of the heating cylinder 3 has the detector attachment unit 5a . . . for which the temperature detector 6a . . . is detachably attached to the outer surface 3f of the heating cylinder 3 and for which the at least two or more mounting hole sections 5af, 5am, 5ar . . . are provided that can be attached with the temperature detector 6a . . . by selecting at least a different position in the axial direction Fs of the heating cylinder 3. In order to change (or adjust) at least apart of the inner wall face temperature distribution At, in addition to a change (or adjustment) of the set temperature as in the conventional case, a multi-aspect and flexible change (or adjustment) can be provided by a change of the control point position Xwa . . . as well as a combination of a change of the set temperature and a change of the control point position Xwa . . . .

(3) According to a preferred embodiment, the heating units 4a and 4b . . . can be provided at a plurality of different positions of the outer surface 3f in the axial direction Fs of the heating cylinder 3. The detector attachment units 5a and 5b . . . are provided at a plurality of different positions in the axial direction Fs of the heating cylinder 3 and/or the circumferential direction Ff. This can consequently provide the inner wall face temperatures Tia and Tib . . . at a plurality of different positions at the inner wall face of the heating cylinder 3. Thus, the characteristic pattern regarding the inner wall face temperature distribution At in the axial direction Fs of the inner wall face 3i in particular can be calculated more accurately and an accurate temperature control can be realized that matches the resin type and a molded article, for example.

(4) According to a preferred embodiment, the temperature control system 7 has the inner wall face temperature distribution calculation function unit Et that calculates, based on the inner wall face temperatures Tia and Tib . . . at a plurality of positions obtained by the inner wall face temperature conversion function unit Ec, the inner wall face temperature distribution At at the inner wall face 3i in the axial direction Fs by calculation processing. The inner wall face temperature display function unit Ed has the display processing function to display the inner wall face temperature distribution At calculated by the inner wall face temperature distribution calculation function unit Et. This can consequently provide an accurate characteristic pattern in regards to the inner wall face temperature distribution At in the axial direction Fs of the inner wall face 3i in a visual manner, thus providing the state of the inner wall face temperature distribution At in a simple and appropriate manner.

(5) According to a preferred embodiment, the temperature detectors 6a and 6b . . . include at least two or more mounting hole sections 5af, 5ap, and 5aq . . . that can be attached with different selected attachment depths. This can consequently provide, in addition to a change of the positions of the control point positions Xwa . . . and Xwb . . . , a change of the attachment depth as well as a combination of a change of the position and a change of the attachment depth. Thus, the inner wall face temperature distribution At can be more minutely grasped in a pattern-like manner, thus contributing to a further accurate and optimal temperature control.

(6) According to a preferred embodiment, the heating units 4a and 4b . . . use a band heater wound along the outer surface 3f of the heating cylinder 3. This can provide the direct use of existing components widely used as a heating means of the heating cylinder 2. Thus, even the addition of the mounting hole sections 5af . . . , 5ap . . . , 5bf . . . , and 5bp . . . in accordance with the present invention can be handled in a relatively simple manner and the contribution to reduced cost also can be realized.

(7) According to a preferred embodiment, the temperature detectors 6a and 6b . . . use a temperature sensor formed to have a bar-like configuration by a thermocouple. This can realize the direct use of existing components widely used for the detection of the temperature of the heating cylinder 3. Thus, even the addition of the mounting hole sections 5af . . . , 5ap . . . , 5bf . . . , and 5bp . . . in accordance with the present invention can be handled in a relatively simple manner and a combination with a band heater in particular can provide an optimal embodiment.

(8) According to a preferred embodiment, the inner wall face temperature conversion function unit Ec is provided and performs conversion processing to convert the detected heating temperatures Twa . . . and Twb . . . to the inner wall face temperatures Tia . . . and Tib . . . by using the calculation formulae (i.e., [formula 101], [formula 102], and [formula 103]) based on data regarding the lengths of the heating units 4a and 4b . . . in the axial direction Fs, the control point positions Xwa . . . and Xwb . . . of the heating cylinder 3, and the shape and material of the heating cylinder 3. This can consequently provide the conversion of the heating temperatures Twa . . . and Twb . . . to the inner wall face temperatures Tia . . . and Tib . . . by computer processing in a simple manner. Thus, such a conversion can be realized in a simple and low-cost manner by the change or addition of software for a molding machine controller provided in the injection molding machine M.

(9) According to a preferred embodiment, the inner wall face temperature distribution calculation function unit Et has the control point position calculation function Etp that calculates the optimal control point positions Xwa . . . and Xwb . . . based on data regarding the calculation formulae ([formula 101], [formula 102], and [formula 103], the inner wall face temperatures Tia . . . and Tib . . . , and the inner wall face temperature distribution At. This can consequently provide the automatic introduction of the optimal control point positions Xwa . . . and Xwb . . . without depending on personal experience or intuition, for example. This can lead to the contribution to molded articles having a higher quality and stability and an easier and lower-cost implementation by the secondary use of the function of the inner wall face temperature distribution calculation function unit Et.

(10) According to a preferred embodiment, the inner wall face temperature display function unit Ed is configured so that the temperature display unit 8 has the temperature distribution display function Edt to graphically display the inner wall face temperature distribution At. This provides the graphical display of the inner wall face temperature distribution At using the display included in the injection molding machine M. Thus, an operator (user) can easily grasp the temperature distribution state of the inner wall face temperatures Tia . . . and Tib . . . accurately reflecting the resin temperature, and can promptly subject molding conditions, for example, to an appropriate change processing.

(11) According to a preferred embodiment, the inner wall face temperature display function unit Ed is configured to include the detector position display function Edx that displays, in the graphic display of the inner wall face temperature distribution At displayed on the temperature display unit 8, the control point positions Xwa . . . and Xwb . . . as the attachment positions of the temperature detectors 6a and 6b . . . to be associated with the inner wall face temperature distribution At. This allows a user to easily and accurately grasp the control point positions Xwa . . . and Xwb . . . in relation to the inner wall face temperature distribution At, thus providing the change (or adjustment) of the control point positions Xwa . . . and Xwb . . . and the inner wall face temperature distribution At in an appropriate and prompt manner.

DESCRIPTION OF REFERENCE NUMERALS

1: Temperature control device, 2: Screw 3: Heating cylinder, 3f: Outer surface, 3i: Inner wall face, 4a: Heating unit, 4b . . . : Heating unit, 5a: Detector attachment unit, 5b . . . : Detector attachment unit, 5af: Mounting hole section, 5am . . . : Mounting hole section, 5bf: Mounting hole section, 5bm . . . : Mounting hole section, 5ap: Mounting hole section, 5aq: Mounting hole section, 6a: Temperature detector, 6b . . . : Temperature detector, 7: Temperature control system, 8: Temperature display unit, Fs: Axial direction, Ff: Circumferential direction, Tw (Twa, Twb . . . ):

Heating temperature (control point temperature), Ti (Tia, Tib . . . ): Inner wall face temperature, At: Inner wall face temperature distribution, Ec: Inner wall face temperature conversion function unit, Et: Inner wall face temperature distribution calculation function unit, Ed: Inner wall face temperature display function unit, Etp: Control point position calculation function, Edt: Temperature distribution display function, Edx: Detector position display function

BEST MODE FOR CARRYING OUT THE INVENTION

Next, the following section will describe in detail the best embodiment according to the present invention based on the drawings.

First, in order to facilitate the easy understanding of the temperature control device 1 according to this embodiment, the following section will describe the outline of the injection molding machine M including the temperature control device 1 with reference to FIG. 1-FIG. 5.

Figure 4:
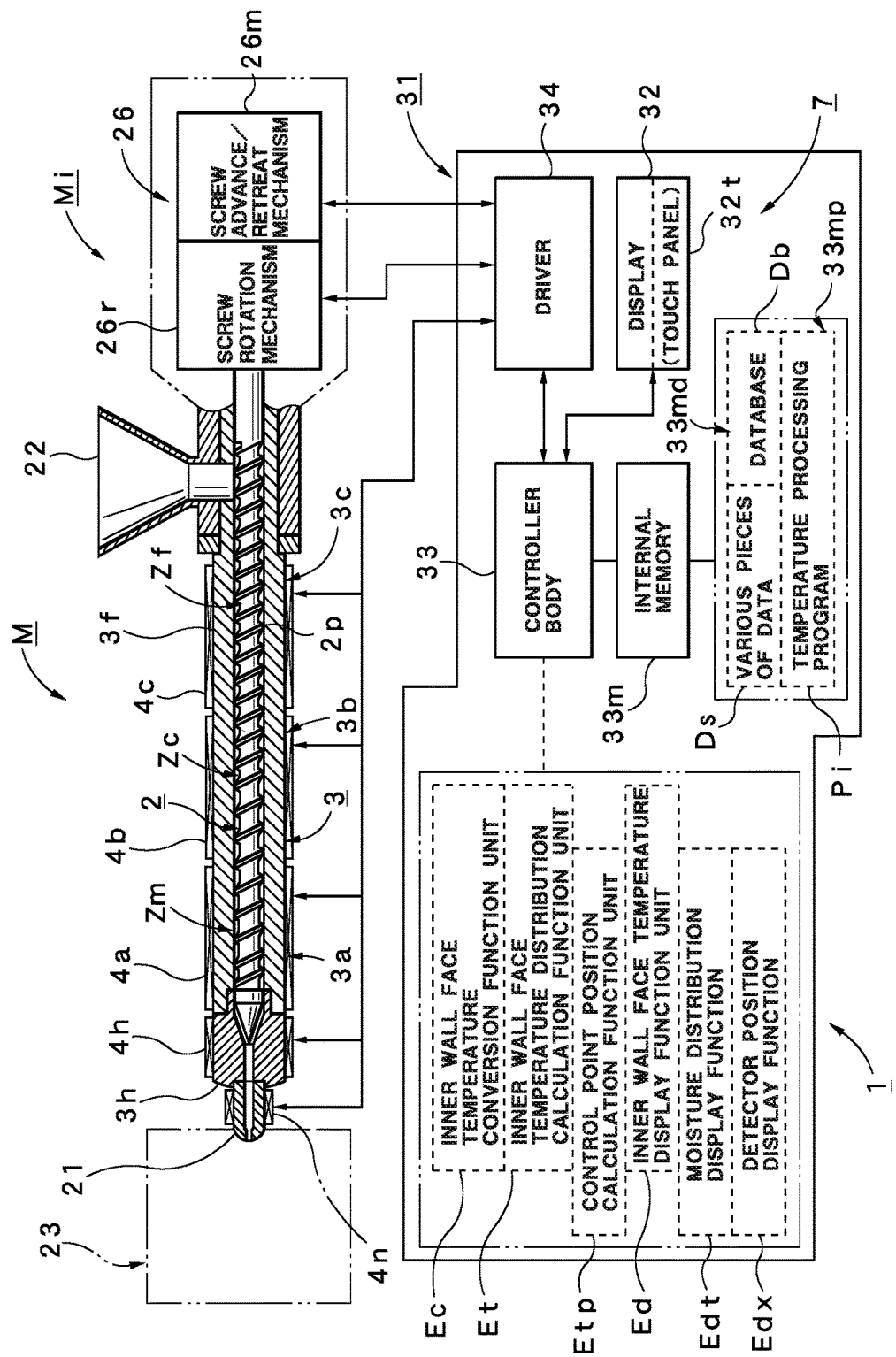
FIG. 4 is a block system diagram illustrating an injection molding machine including the temperature control device.
Figure 5:
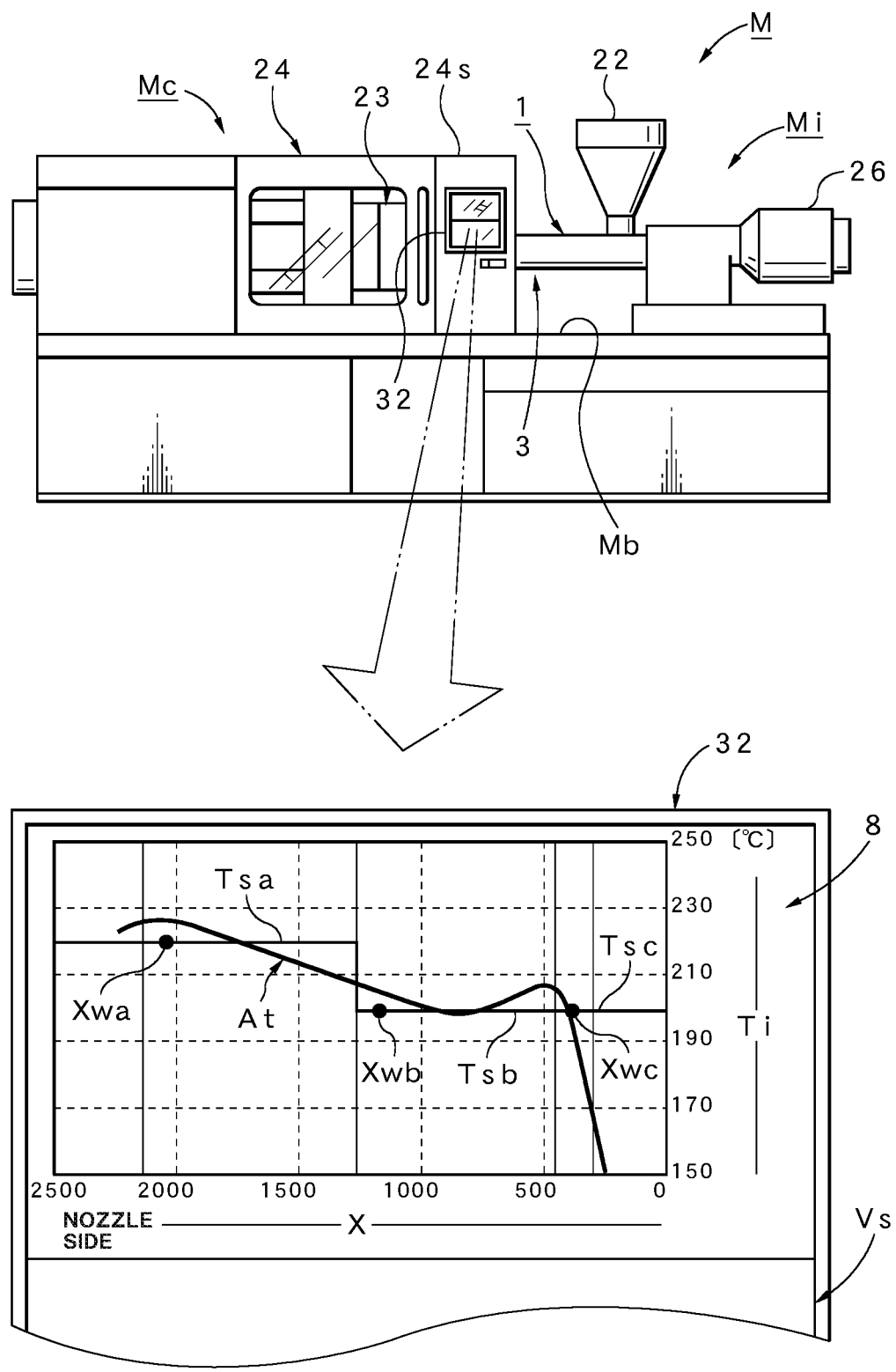
FIG. 5 illustrates the entire appearance of the injection molding machine and is an extracted enlarged view illustrating a temperature display unit.

FIG. 5 illustrates the entire appearance of the injection molding machine M including a partial extracted enlarged view of the temperature display unit 8. The injection molding machine M includes an injection device Mi and a clamping device Mc provided on a molding machine bed Mb. The injection device Mi has an injection nozzle 21 (see FIG. 4) at the front end and has the heating cylinder 3 having a hopper 22 receiving the supply of resin material (resin pellet) at the rear part. On the other hand, the clamping device Mc includes the metal mold 23 consisting of a mobile mold and a fixed mold. The molding machine bed Mb has thereon a protection panel 24. An intermediate panel 24s positioned in the vicinity of the center in particular has a display 32 to display, on the screen, the temperature display unit 8 constituting a part of the temperature control device 1 according to this embodiment. The injection molding machine M includes a molding machine controller 31 shown in FIG. 4. This molding machine controller 31 is connected to a display 32. Thus, the molding machine controller 31 and the display 32 constitute the main part of the temperature control system 7 in the temperature control device 1.

FIG. 4 illustrates a part of the injection device Mi including the internal structure of the heating cylinder 3 to which the temperature control device 1 according to this embodiment is attached, and the block system of the molding machine controller 31. As shown in this drawing, the above-described injection nozzle 21 is fixedly attached to the front end of the heating cylinder 3 via a head unit 3h. This injection nozzle 21 has a function to inject the resin which was plasticized and melted in the heating cylinder 3 into the metal mold 23 shown by the phantom line. The heating cylinder 3 includes therein the screw 2 attached so as to be able to move rotatably and freely. This screw 2 has a helical flight unit 2p on the circumferential face thereof. This screw 2 also has a metering zone Zm, a compression zone Zc, and a feed zone Zf in an order from the front side to the rear side. On the other hand, the rear end of the screw 2 is coupled to a screw driving unit 26. The screw driving unit 26 includes a screw rotation mechanism 26r to rotate the screw 2 and a screw advance/retreat mechanism 26m to cause the screw 2 to advance and retreat. The screw rotation mechanism 26r and the screw advance/retreat mechanism 26m may be driven by any driving method, such as a hydraulic method using a hydraulic circuit, or an electrical method using an electric motor.

Furthermore, the heating cylinder 3 has heating units 4a, 4b, and 4c in the temperature control device 1 according to this embodiment. The heating cylinder 3 has, in an order from the front side to the rear side, a heating cylinder front part 3a, a heating cylinder middle part 3b, and a heating cylinder rear part 3c. Thus, the outer surfaces of the respective parts 3a, 3b, and 3c have a front part heating unit 4a, a middle part heating unit 4b, and a rear part heating unit 4c, respectively. The respective heating units 4a, 4b, and 4c use a band heater wound along the outer surface 3f of the heating cylinder 3. The use of such a band heater as the heating unit 4a . . . can provide the direct use of existing components widely used as a heating means of the heating cylinder 2. Thus, even the addition of the mounting hole sections 5af . . . , 5ap . . . , 5bf . . . , and 5bp . . . in accordance with the present invention can be achieved in a relatively easy manner and contribution to a lower cost also can be obtained. The reference numeral "4h" shows a head heating unit (band heater) attached to the outer surface of the head unit 3h, and the reference numeral "4n" shows a nozzle heating unit (band heater) attached to the outer surface of the injection nozzle 21, respectively.

On the other hand, the molding machine controller 31 has a function to provide the entire control of the injection molding machine M. Thus, the molding machine controller 31 includes a controller body 33 having a computer function in which a CPU and hardware such as an accompanying internal memory 33m are provided. The above-described display 32 is connected to the connection port of the controller body 33 to thereby display required information, and has an accompanying touch panel 32t to provide various operations such as input, setting, or selecting operations. The controller body 33 is connected to a driver 34 to drive (operate) various actuators. This driver 34 is connected to the above-described screw rotation mechanism 26r and screw advance/retreat mechanism 26m and is connected to the respective heating units 4a, 4b, 4c, 4h, and 4n. This allows the controller body 33 to control the driving of the screw rotation mechanism 26r and the screw advance/retreat mechanism 26m via the driver 34 and to control the energization (power supply) to the respective heating units 4a, 4b, 4c, 4h, and 4n.

The molding machine controller 31 includes an HMI (human-machine interface) control system and a PLC (programmable logic controller) control system. The internal memory 33m stores therein the PLC program and the HMI program. The PLC program is software to realize the sequence operation of various steps in the injection molding machine M and the monitoring of the injection molding machine M, for example. The HMI program is software to realize the setting and display of the operation parameters of the injection molding machine M and the display of the operation monitoring data of the injection molding machine M, for example.

The internal memory 33m has a data area 33md into which various data Ds such as molding condition data and databases Db can be written, and has a program area 33mp in which various programs can be stored. Thus, the internal memory 33m is configured in relation to the temperature control device 1 according to this embodiment, and at least the data area 33md includes the registered data for the lengths of the respective heating units 4a, 4b, and 4c in the axial direction Fs and data (information) for the shape and material of the heating cylinder 3, for example, and the program area 33mp stores therein a temperature processing program Pi by application software in order to realize the inner wall face temperature conversion function unit Ec, the inner wall face temperature distribution calculation function unit Et including the control point position calculation function Etp, and the inner wall face temperature display function unit Ed including the temperature distribution display function Edt and the detector position display function Edx, respectively.

Next, the following section will describe the configuration of the temperature control device 1 according to this embodiment preferably used for such an injection molding machine M, with reference to FIG. 1-FIG. 7.

Figure 1:
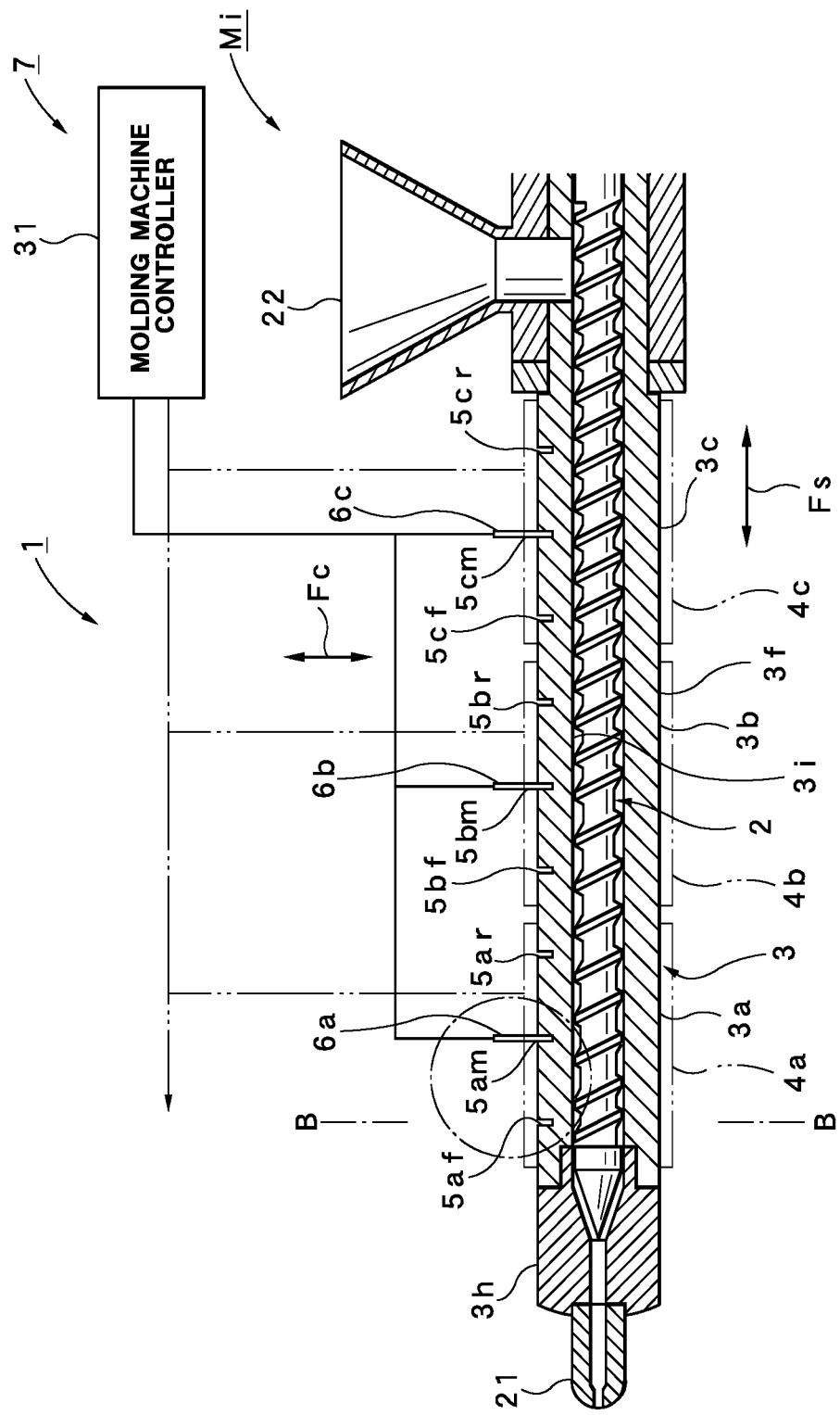
FIG. 1 illustrates the configuration of the main part of a temperature control device according to a preferred embodiment of the present invention.

FIG. 1 illustrates the structure of the cross section of the heating cylinder 3. The heating cylinder 3 shown in an embodiment is illustrated, in order to provide easy understanding, in an example in which three divided portions of the heating cylinder front part 3a, the heating cylinder middle part 3b, and the heating cylinder rear part 3c in an order from the front side to the rear side are used as described above. The outer surface 3f corresponding to the respective parts 3a, 3b, and 3c has the front part heating unit 4a, the middle part heating unit 4b, and the rear part heating unit 4c shown by the phantom line in FIG. 1, respectively.

The conventional heating cylinder 3 having the structure as described above includes the three corresponding temperature detectors 6a, 6b, and 6c in order to detect the heating temperatures Twa, Twb, and Twc of the respective parts 3a, 3b, and 3c. The respective temperature detectors 6a, 6b, and 6c are attached to the portions corresponding to the heating cylinder front part 3a, the heating cylinder middle part 3b, and the heating cylinder rear part 3c, respectively. Specifically, as shown in FIG. 1, in the case of the temperature detector 6a, for example, an exclusive mounting hole section 5am is formed in a direction from the outer surface 3f of the heating cylinder 3 to the center, and is attached by inserting the temperature detector 6a to this mounting hole section 5am. Other temperature detectors 6b and 6c are similar to the temperature detector 6a and are attached to exclusive mounting hole sections 5bm and 5cm, respectively. Thus, the mounting hole sections 5am, 5bm, and 5cm are provided for the respective parts 3a, 3b, and 3c, respectively, and the respective detector attachment units 5a, 5b, and 5c are constituted by the respective mounting hole sections 5am, 5bm, and 5cm.

The temperature detectors 6a, 6b, and 6c use a temperature sensor formed to have a bar-like configuration by a thermocouple. The use of such a temperature sensor can provide the direct use of existing components widely used to detect the temperature of the heating cylinder 3. Thus, even the addition of the mounting hole sections 5af . . . , 5ap . . . , 5bf . . . , and 5bp . . . in accordance with the present invention can be achieved in a relatively easy manner and a combination with a band heater in particular, can advantageously provide the best mode.

On the other hand, in the temperature control device 1 according to this embodiment, the respective mounting hole sections 5am, 5bm, and 5cm are configured so that the respective temperature detectors 6a, 6b, and 6c can be detachably attached thereto. Specifically, the respective temperature detectors 6a, 6b, and 6c can be attached by being fixedly positioned and can be detached by removing the respective temperature detectors 6a, 6b, and 6c as required from the respective mounting hole sections 5am, 5bm, and 5cm.

Figure 2:
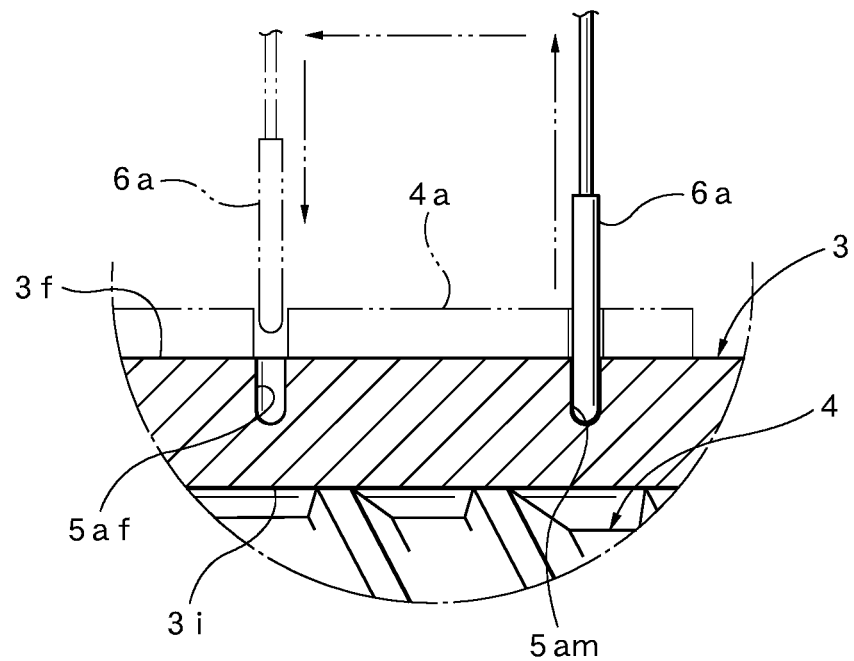
FIG. 2 is an extracted enlarged view of the dashed line circle in FIG. 1.

As shown in FIG. 1, the second mounting hole section 5af and the third mounting hole section 5ar are formed, respectively, at the front and rear positions of the mounting hole section 5am in the axial direction Fs of the heating cylinder 3 with a predetermined interval therebetween. The mounting hole sections 5af and 5ar have the same form as that of the mounting hole section 5am. This allows the temperature detector 6a to select and attach, as shown in FIG. 2, the attachment position (control point position Xwa) to the mounting hole section 5af or the mounting hole section 5ar based on the mounting hole section 5am positioned at a middle position as a reference position. Thus, in the case of the temperature control device 1 according to this embodiment, the detector attachment unit 5a for attaching the temperature detector 6a is composed of three mounting hole sections 5af, 5am, and 5ar that can be attached to selected different positions.

This also applies to the other detector attachment units 5b and 5c. The detector attachment unit 5b is composed of three mounting hole sections 5bf, 5bm, and 5br to which selected temperature detectors 6b can be attached respectively; and the detector attachment unit 5c is composed of three mounting hole sections 5cf, 5cm, and 5cr to which selected temperature detectors 6c can be attached, respectively. As shown in the case of the illustrated heating cylinder 3 in FIG. 1, the three parts (the heating cylinder front part 3a, the heating cylinder middle part 3b, and the heating cylinder rear part 3c) have three mounting hole sections 5af . . . , 5bf . . . , and 5cf . . . , respectively to thereby provide the entire configuration in which the total of nine mounting hole sections 5af, 5am . . . 5cm, and 5cr are provided along the axial direction Fs.

As described above, the respective detector attachment units 5a, 5b, and 5c are formed so that the respective temperature detectors 6a, 6b, and 6c can be detachably attached thereto and the respective temperature detectors 6a, 6b, and 6c can be attached to three (or generally at least two or more) mounting hole sections 5af, 5am . . . , 5bf, 5bm . . . , 5cf, and 5cm . . . at different selected positions in at least the axial direction Fs of the heating cylinder 3, respectively. This can provide, in order to change (or adjust) the inner wall face temperature distribution At (which will be described later), not only a change (adjustment) of the set temperature as in the conventional case, but also a change of the control point positions Xwa . . . and Xwb . . . and the set temperature and the control point positions Xwa . . . and Xwb . . . in a combinational manner. As a result, a multi-aspect change of the settings can provide a characteristic pattern having a desired and appropriate inner wall face temperature distribution At and can realize a highly accurate temperature control matching the resin type and molded article, for example.

The respective temperature detectors 6a, 6b, and 6c are connected to the molding machine controller 31 (the controller body 33) as shown in FIG. 1. The respective heating units 4a, 4b, and 4c are connected to the driver 34 of the molding machine controller 31 as shown in FIG. 4. In this manner, the temperature control system 8 in the temperature control device 1 according to this embodiment is constituted.

On the other hand, the molding machine controller 31 (the controller body 33) includes the inner wall face temperature conversion function unit Ec to perform conversion processing to convert the heating temperatures Twa, Twb, and Twc detected by the temperature detectors 6a, 6b, and 6c to the inner wall face temperatures Tia, Tib, and Tic of the heating cylinder 3. Thus, when the detected heating temperatures Twa, Twb, and Twc are given to the molding machine controller 31, then the heating temperatures Twa, Twb, and Twc are converted by the conversion processing function of the inner wall face temperature conversion function unit Ec to the inner wall face temperatures Tia, Tib, and Tic.

Figure 6:
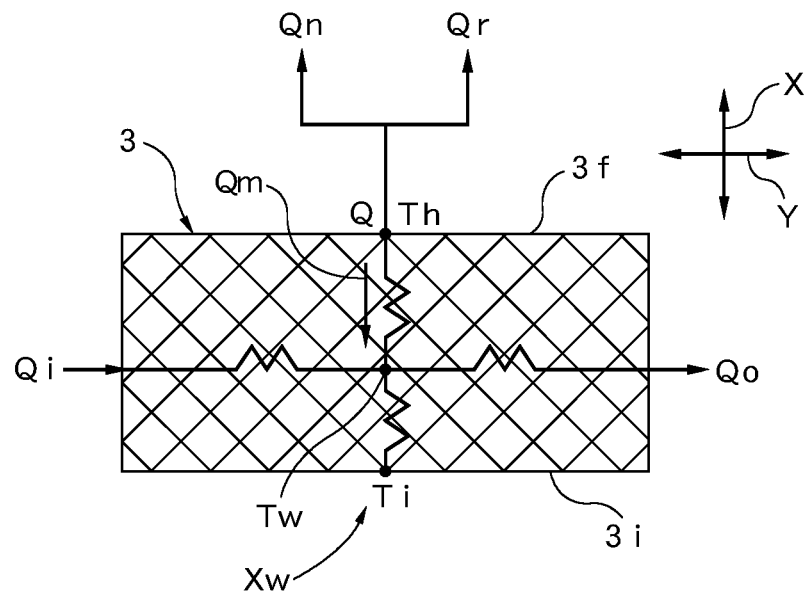
FIG. 6 illustrates the principle of the conversion processing to convert the heating temperature detected in the temperature control system of the temperature control device to the inner wall face temperature.

The following section will describe the conversion principle of the inner wall face temperature conversion function unit Ec (i.e., a function (principle) to convert the detected heating temperature Tw to the inner wall face temperature Ti) with reference to FIG. 6.

FIG. 6 illustrates the heating state of the heating cylinder 3 in an equivalent manner. Factors influencing on this equivalent heating state include at least the length of the band heater (heating unit) in the axial direction Fs, the control point position Xw of the heating cylinder 3, the shape of the heating cylinder 3, and the material of the heating cylinder 3. Thus, information related to these factors is added to this equivalent heating state. Thus, a calculation formula based on these factors (information) can allow the computer processing function included in the molding machine controller 31 to perform conversion processing to convert the heating temperature Tw (Twa, Twb, and Twc) to the inner wall face temperature Ti (Tia, Tib, and Tic) of the heating cylinder 3.

As described above, an inner wall face temperature conversion function unit Ec is provided that uses the calculation formulae [formula 101], [formula 102], and [formula 103] based on data related to the lengths of the heating units 4a, 4b, and 4c in the axial direction Fs, the control point position Xw (Xwa, Xwb, and Xwc) of the heating cylinder 3, and the shape and material of the heating cylinder 3, to perform conversion processing to convert the detected heating temperature Tw (Twa, Twb, and Twc) to the inner wall face temperature Ti (Tia, Tib, and Tic). The inner wall face temperature conversion function unit Ec can easily convert the heating temperatures Twa . . . and Twb . . . to the inner wall face temperatures Tia . . . and Tib . . . by computer processing. Thus, the conversion processing can be performed in a simple and low-cost manner by the change or addition of software to the molding machine controller provided in the injection molding machine M.

In the drawing, the reference numeral "Tw" shows the heating temperature (control point temperature) [° C.° C.], the reference numeral "Ti" shows the inner wall face temperature [° C.], the reference numeral "Th" shows the outer surface temperature of the heating cylinder 3 [° C.], the reference numeral "Q" shows the heating value [J] of the band heater (heating unit), the reference numeral "Qn" shows the heat radiation value [J] by natural convection, the reference numeral "Qr" shows the heat radiation value [J] by radiation, the reference numeral "Qi" shows the heating value [J] flowing from an adjacent band heater (heating unit), the reference numeral "Qo" shows the heating value [J] flowing to an adjacent band heater (heating unit), the reference numeral "Qm" shows the heating value [J] obtained by deducting the heat radiation value from the heating value.

The calculation formulae established based on this equivalent heating state are shown by [formula 101], [formula 102], and [formula 103].

$$Th=f(Q,Qn,Qr,Do,Di,k,L)+Ti \qquad \text{[Formula 101]}$$

$$Tw=f(Q,Qn,Qr,Do,Di,\rho,c,L,H) \qquad \text{[Formula 102]}$$

$$Ti=Th\cdot f(Di,H)-Tw\cdot f(Do,Di,H) \qquad \text{[Formula 103]}$$

The reference numeral "k" denotes a coefficient, the reference numeral "L" denotes a band heater length, the reference numeral "ρ" denotes a sphere density, the reference numeral "c" denotes a specific heat capacity, the reference numeral "H" denotes the height from the inner wall face 3i to the control point Tw, the reference numeral "Di" denotes the inner diameter of the heating cylinder 3, and the reference numeral "Do" denotes the outer diameter of the heating cylinder, respectively.

Thus, by repeatedly calculating the solutions of three calculation formulae [formula 101] to [formula 103] by the calculation processing with the computer function, the heating temperature (control point temperature) Tw [° C.] at the control point position Xw can be converted to the inner wall face temperature Ti [° C.] and the outer surface temperature Th [° C.]. The calculation formulae (i.e., [formula 101], [formula 102], and [formula 103]) are set in the internal memory 33m in advance as calculation formula data.

The molding machine controller 31 (controller body 33) includes the inner wall face temperature distribution calculation function unit Et that calculates, based on the resultant inner wall face temperature T . . . , the inner wall face temperature distribution At the inner wall face 3i in the axial direction Fs by the calculation processing. Specifically, the inner wall face temperature distribution At in the axial direction Fs of the heating cylinder 3 can be calculated by the calculation processing in consideration of the heating value Qi[J] flowing from an adjacent band heater (heating unit) and the heating value Qo[J] flowing to an adjacent band heater (heating unit) for each resultant inner wall face temperature Ti . . . .

Figure 7:
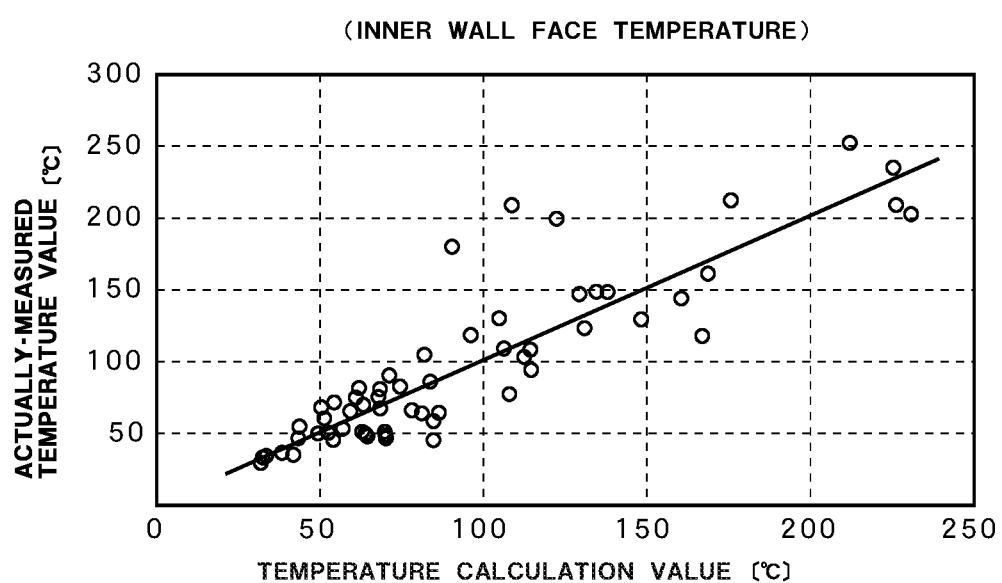
FIG. 7 is a correlation characteristic diagram illustrating the relation between the temperature calculation value related to the inner wall face temperature in the temperature control device and the actually-measured temperature value.

FIG. 7 illustrates the correlation between the temperature calculation value [° C.] thus calculated for each different control point position Xw . . . in the axial direction Fs of the heating cylinder 3 and the actually-measured temperature value [° C.] actually measured at the control point position Xw . . . . As shown in the drawing, a high correlation is confirmed between the temperature calculation value and the actually-measured temperature value.

In addition, the inner wall face temperature distribution calculation function unit Et can have the control point position calculation function Etp that calculates optimal control point positions Xwa, Xwb, and Xwc based on the data related to the calculation formulae [formula 101], [formula 102], and [formula 103], the inner wall face temperatures Tia, Tib, and Tic, and the inner wall face temperature distribution At. This control point position calculation function Etp can be set in advance in the molding machine controller 31. The existence of such a control point position calculation function Etp can provide the automatic introduction of optimal control point positions Xwa . . . and Xwb . . . without requiring personal experience or intuition, for example. This can lead to the contribution to molded articles having a higher quality and stability and an easier and lower-cost implementation by means of the secondary use of the function of the inner wall face temperature distribution calculation function unit Et.

On the other hand, the temperature control system 8 in the temperature control device 1 has the inner wall face temperature display function unit Ed to perform at least display processing on the resultant inner wall face temperature distribution At. This inner wall face temperature display function unit Ed has the temperature distribution display function Edt as the first display function. This temperature distribution display function Edt allows the temperature display unit 8 shown in FIG. 5 to provide the graphical display of the calculated inner wall face temperature distribution At. Thus, the provision of the temperature distribution display function Edt as described above can realize the graphic display of the inner wall face temperature distribution At using the display provided in the injection molding machine M. Thus, the operator (user) can easily grasp the temperature distribution states of the inner wall face temperatures Tia . . . and Tib . . . accurately reflecting the resin temperature and can promptly perform appropriate change processing on the molding conditions, for example.

The inner wall face temperature display function unit Ed has the detector position display function Edx that displays, as the second display function, the control point positions Xwa, Xwb, and Xwc as the attachment position of the temperature detectors 6a, 6b, and 6c on the graphic display of the inner wall face temperature distribution At displayed on the temperature display unit 8 while being associated with the inner wall face temperature distribution At. FIG. 5 illustrates this display embodiment. In FIG. 5, Tsa, Tsb, and Tsc show a set temperature. In the illustrated case, the heating cylinder front part 3a has a set temperature Tsa of 220 [° C.], and the heating cylinder middle part 3b and the heating cylinder rear part 3c have set temperatures Tsb and Tsc of 200 [° C.].

The black circle Xwa shows the position (control point position) of the temperature detector 6a, the black circle Xwb shows the position (control point position) of the temperature detector 6b, and the black circle Xwc shows the position (control point position) of the temperature detector 6c, respectively. Thus, the existence of the detector position display function Edx as described above allows the user to grasp control point positions Xwa . . . and Xwb . . . in relation to the inner wall face temperature distribution At in a simple and accurate manner. This can advantageously provide a change (adjustment) of the control point positions Xwa . . . and Xwb . . . and the inner wall face temperature distribution At in an appropriate and prompt manner.

Figure 8:
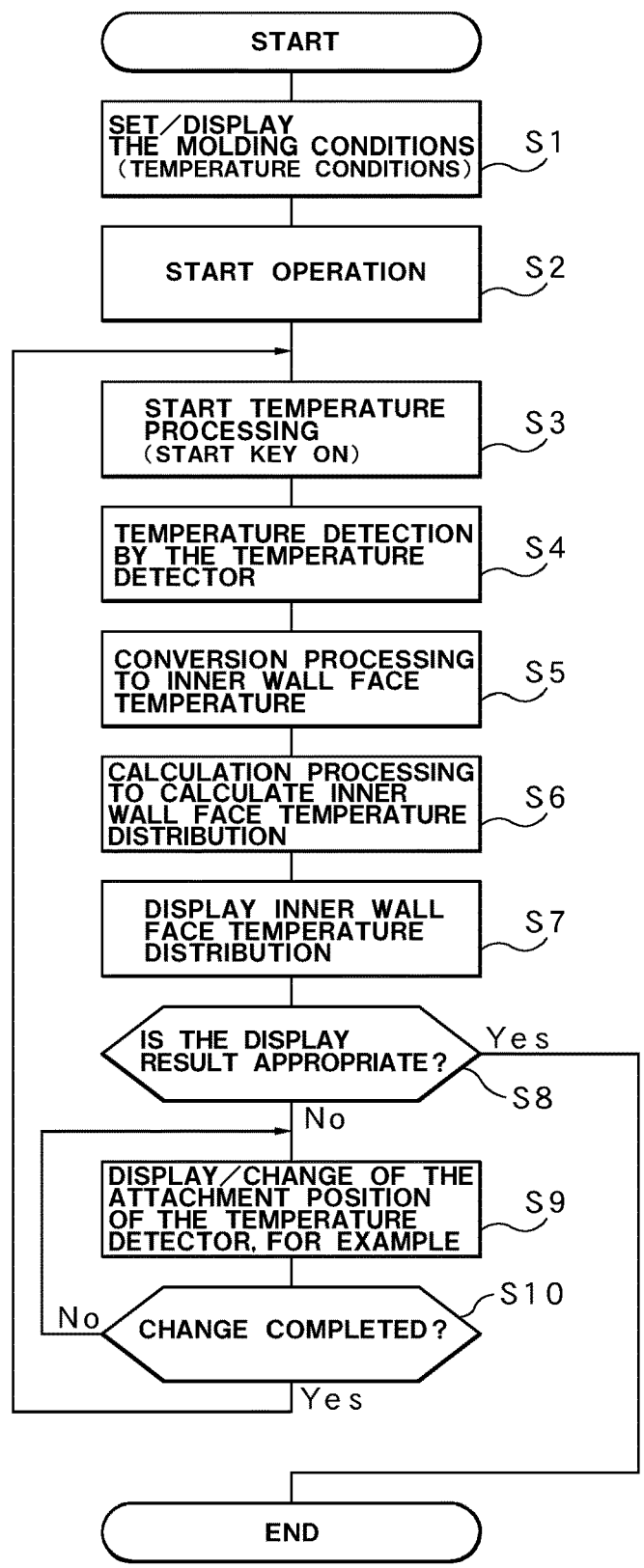
FIG. 8 is a flowchart illustrating one example of a method of using the temperature control device.
Figure 9:
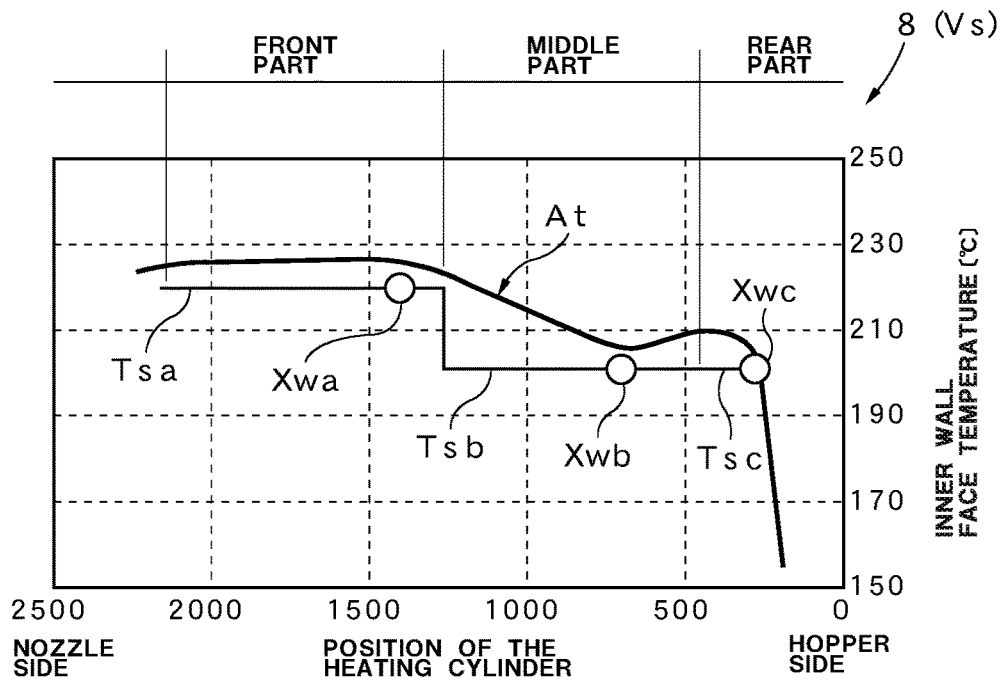
FIG. 9 illustrates the first display screen to explain one example of the method of using the temperature control device.
Figure 10:
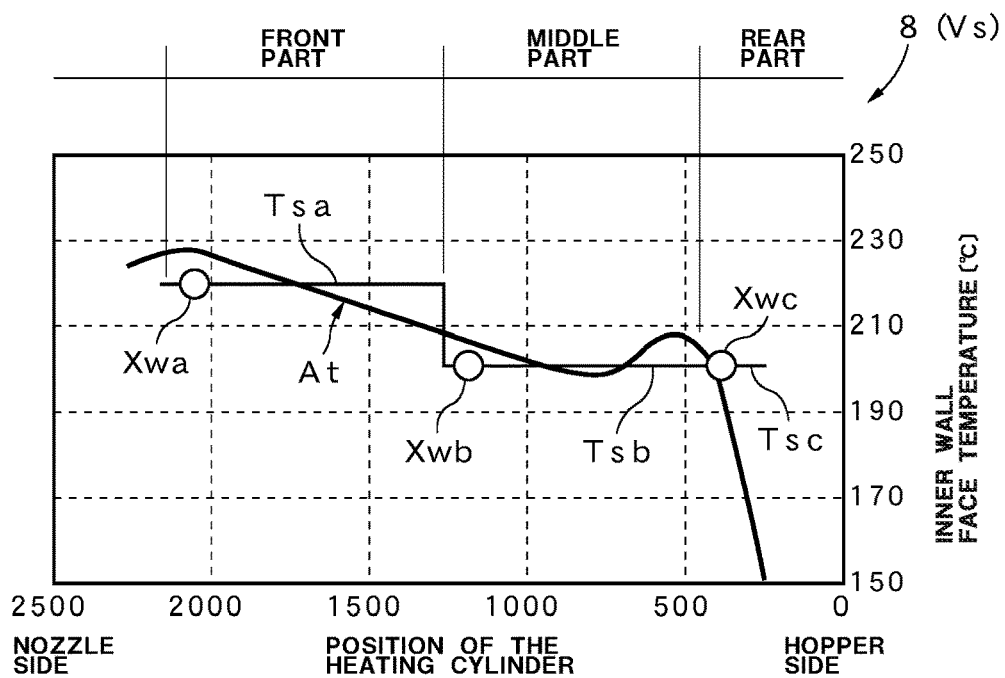
FIG. 10 illustrates the second display screen to explain one example of the method of using the temperature control device.

Next, the following section will describe the function (use method) of the temperature control device 1 according to this embodiment with reference to FIG. 9 and FIG. 10 and with reference to the flowchart of FIG. 8.

Illustrated is the use method during the setting of the molding conditions (in particular the use method related to the setting of the temperature conditions). In this case, the operator (user) firstly sets the molding conditions in the injection molding machine M based on a general setting procedure. In particular, the temperature conditions are set in the relation to this embodiment and the set temperature conditions are displayed as set temperatures Tsa, Tsb, and Tsc by the temperature display unit 8 in a part of the temperature setting screen Vs shown in FIG. 9 (Step S1). Illustrated is a case where the heating cylinder front part 3a has a set temperature Tsa set to 220 [° C.], the heating cylinder middle part 3b has a set temperature Tsb set to 200 [° C.], and the heating cylinder rear part 3c has a set temperature Tsc set to 200 [° C.].

The detector position display function Edx also displays the positions of the respective temperature detectors 6a, 6b, and 6c superposed on the display line of the set temperatures Tsa, Tsb, and Tsc of the temperature display unit 8. This consequently allows the attachment positions of the temperature detectors 6a, 6b, and 6c (i.e., the control point positions Xwa, Xwb, and Xwc), to be displayed associated with the inner wall face temperature distribution At (which will be described later) as described above, thus facilitating the simple and accurate understanding of the control point positions Xwa . . . and Xwb . . . in relation to the inner wall face temperature distribution At.

Thus, the control point positions Xwa, Xwb, and Xwc can be changed in a simple and prompt manner. This temperature display unit 8 (FIG. 9, FIG. 10) is displayed on the screen of the display 32 shown in FIG. 5 as described above.

After the setting step of the molding conditions in the initial stage is completed, the operation of the injection molding machine M is started (Step S2). After the start of the operation, when the heating temperature at the control point position Xwa . . . is stabilized, a predetermined start key is turned ON to execute the temperature processing program Pi (Step S3). As a result, the temperature detection by the temperature detectors 6a, 6b, and 6c is firstly performed (Step S4). The detected heating temperature at the control point position Xwa . . . (i.e., the control point temperature Twa . . . ) is given to the molding machine control 31 and is subjected to conversion processing by the calculation formulae (i.e., [formula 101], [formula 102], and [formula 103]), at the temperature conversion processing function unit Ec to convert the heating temperature to the inner wall face temperature Tia . . . and the outer surface temperature (Th . . . ) (Step S5). When the inner wall face temperature Tia . . . and the outer surface temperature (Th . . . ) are obtained, the inner wall face temperature distribution calculation function unit Et performs calculation processing to calculate the inner wall face temperature distribution At in the axial direction Fs of the heating cylinder 3 (Step S6).

When the inner wall face temperature distribution At is obtained on the other hand, the characteristic pattern curve of this inner wall face temperature distribution At is displayed on the temperature display unit 8 as shown in FIG. 9 (Step S7). As a result, the operator (user) can confirm the state of the inner wall face temperature distribution At displayed on the temperature display unit 8. Specifically, the inner wall face temperature Tia . . . at each position can be confirmed and the inner wall face temperature distribution At can be used to grasp the distribution state in a simple and accurate manner, thus promptly providing the required processing to change the molding conditions, for example. Specifically, the operator can confirm the inner wall face temperature Tia . . . and the temperature distribution At and can complete, when judging that the display result is in an appropriate state (range), the setting step related to the set temperature to subsequently proceed to the next operation step (Step S8). In this case, a desired and appropriate characteristic pattern curve of the inner wall face temperature distribution At is obtained, thus realizing highly accurate temperature control and a desirable molding step.

On the other hand, when the operator confirms the inner wall face temperature Tia . . . and the inner wall face temperature distribution At and judges that the display result is in an inappropriate state (range), the inner wall face temperature Tia . . . and the inner wall face temperature distribution At can be changed (Step S8). In this case, when the inner wall face temperature Tia . . . is at an excessively-high level, for example, the possibility of a deterioration in the molten resin occurs and, when the inner wall face temperature Tia . . . is at an insufficient low level, the possibility of defective plasticization due to insufficiently melted resin occurs. Thus, the set temperatures Tsa, Tsb, and Tsc can be changed and conditions can be changed as necessary for the attachment position of the temperature detectors 6a, 6b, and 6c, for example.

The examples shown in FIG. 9 and FIG. 10 assume a case where the operator judges that a range from the heating cylinder front part 3a to the heating cylinder middle part 3b has an excessively-high resin temperature. In this case, no change is made to the set temperature and the position of the temperature detector 6a . . . is changed based on the function of the temperature control device 1 according to this embodiment. In this case, the changed position is reflected in the display of the attachment position (control point position) Xwa . . . of the temperature detector 6a . . . in the temperature display unit 8 (Step S9).

FIG. 10 shows, as an example, a case where the attachment position of the temperature detector 6a in the heating cylinder front part 3a is changed from the mounting hole section 5am to the mounting hole section 5af at the front side. Since only this change causes the possibility of an insufficient temperature at the rear side, a change is also made for the attachment positions of the temperature detector 6b of the heating cylinder middle part 3b and the temperature detector 6c of the heating cylinder rear part 3c, respectively. The attachment position of the temperature detector 6a (6b, 6c) may be changed by a procedure as shown in FIG. 2 to remove the temperature detector 6a from the mounting hole section 5am, which is the current attachment position, to insert the temperature detector 6a to the mounting hole section 5af at the front side. Such a change of the attachment position can be easily performed by a so-called "exchange".

After all change processing are completed, a predetermined start key is turned ON and the temperature processing program Pi is executed again (Step S10, S3). This consequently resets the processing result to just before the program execution to re-execute a part of the processing based on the temperature processing program Pi. Specifically, the temperature detection by the temperature detectors 6a, 6b, and 6c is performed to provide, based on the changed conditions, the inner wall face temperature Tia . . . and the outer surface temperature (Th . . . ) to calculate the inner wall face temperature distribution At (Steps S4-S6). When the inner wall face temperature distribution At is obtained, the inner wall face temperature distribution At is displayed on the temperature display unit 8 as the curve pattern characteristic of the inner wall face temperature distribution At as shown in FIG. 10 (Step S7).

In the illustrated case, the defect of the excessively-high level of the inner wall face temperature Tia . . . is eliminated in a range from the heating cylinder front part 3a to the heating cylinder middle part 3b. Thus, the operator can judge that the inner wall face temperature Tia . . . and the temperature distribution At are in an appropriate state (range). Thus, the setting step related to the set temperature can be completed to proceed to the next operation step (Step S8). Specifically, the characteristic pattern curve related to a desired and appropriate inner wall face temperature distribution At can be obtained to thereby realize an accurate temperature control and additionally, a desirable molding step.

In the illustrated case, the operator judged the position change of the temperature detectors 6a, 6b, and 6c based on his or her experience or intuition, for example. However, the optimal control point position Xwa . . . can also be calculated automatically by using the control point position calculation function Edx provided in the molding machine controller 31 as described above. Specifically, the target control point position Xwa . . . can be calculated by calculation processing based on the calculation formulae of [formula 101]-[formula 103], the inner wall face temperature Ti, and the inner wall face temperature distribution At. The use of the control point position calculation function Edx can provide, as described above, the automatic introduction of the optimal control point positions Xwa . . . and Xwb . . . without depending on personal experience or intuition, for example. This can lead to the contribution to molded articles having a higher quality and stability, and an easier and lower-cost implementation by means of the secondary use of the function of the inner wall face temperature distribution calculation function unit Et.

Thus, according to the temperature control device 1 according to this embodiment as described above, the temperature control device 1 has a basic main configuration in which the respective temperature detectors 6a and 6b . . . are detachably attached to the outer surface 3f of the heating cylinder 3. The temperature control device 1 has the detector attachment units 5a and 5b-having three (or at least two or more) mounting hole sections 5af, 5am . . . , 5bf, and 5bm . . . , to which the respective temperature detectors 6a and 6b . . . can be attached at different selected positions at least in the axial direction Fs of the heating cylinder 3. The temperature control system 7 has the inner wall face temperature conversion function unit Ec to perform the conversion processing to convert the heating temperatures Twa and Twb . . . detected by the temperature detectors 6a and 6b . . . to the inner wall face temperatures Tia and Tib . . . of the heating cylinder 3, the inner wall face temperature distribution calculation function unit Et to perform calculation processing to calculate the inner wall face temperature distribution At of the inner wall face 3i in the axial direction Fs based on the respective resultant inner wall face temperatures Tia and Tb . . . , and the inner wall face temperature display function unit Ed to perform at least display processing on the calculated inner wall face temperature distribution At. Thus, even when the detected temperature is the heating temperatures Twa and Twb . . . between the inner wall face 3i of the heating cylinder 3 and the outer surface 3f, the temperature of the inner wall face 3i abutted to the resin in the heating cylinder 3 (i.e., the inner wall face temperatures Ta and Tib . . . ) can be confirmed accurately and the inner wall face temperature distribution At can be accurately found. Furthermore, an easy implementation can be performed without requiring a significant change of the attachment structures of the temperature detectors 6a and 6b . . . .

Furthermore, in order to change (adjust) the inner wall face temperature distribution At, not only a change (adjustment) of the set temperature as in the conventional case is possible, but also a change of the control point positions Xwa . . . and Xwb . . . and a combination between a change of the set temperature and a change of the control point positions Xwa . . . and Xwb . . . is possible. As a result, a multi-aspect change of the settings can provide a characteristic pattern having a desired and appropriate inner wall face temperature distribution At, and can realize a highly accurate temperature control matching the resin type and molded article, for example.

Figure 11:
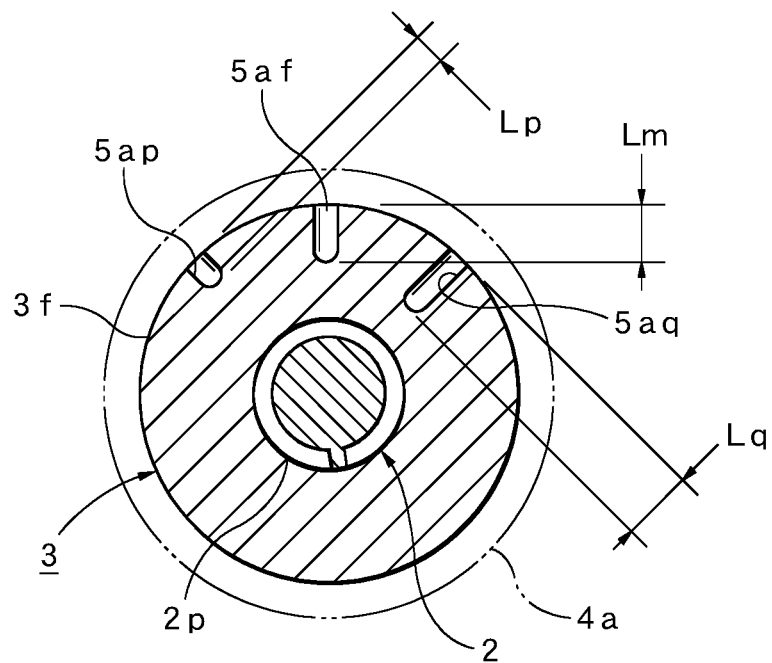
FIG. 11 is a cross-sectional view illustrating a modification example of the temperature control device and is taken along the line B-B of FIG. 1.
Figure 12:
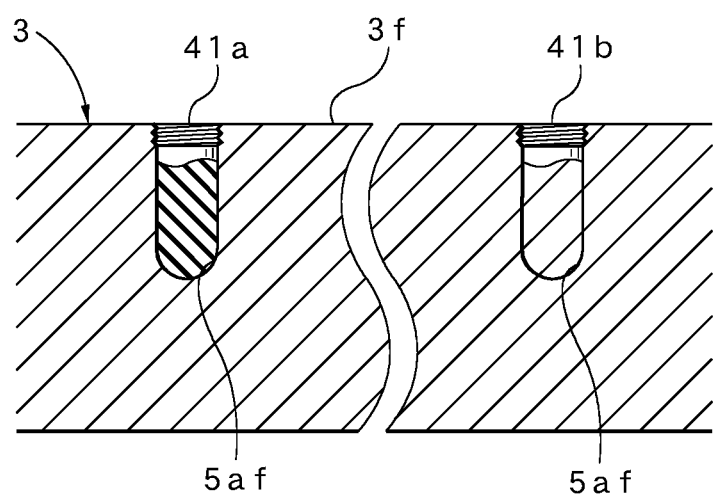
FIG. 12 is a cross-sectional view of a detector attachment unit illustrating another modification example of the temperature control device.

Next, the following section will describe a modification example of the detector attachment unit 5a . . . in the temperature control device 1 according to this embodiment with reference to FIG. 11 and FIG. 12.

Figure 3:
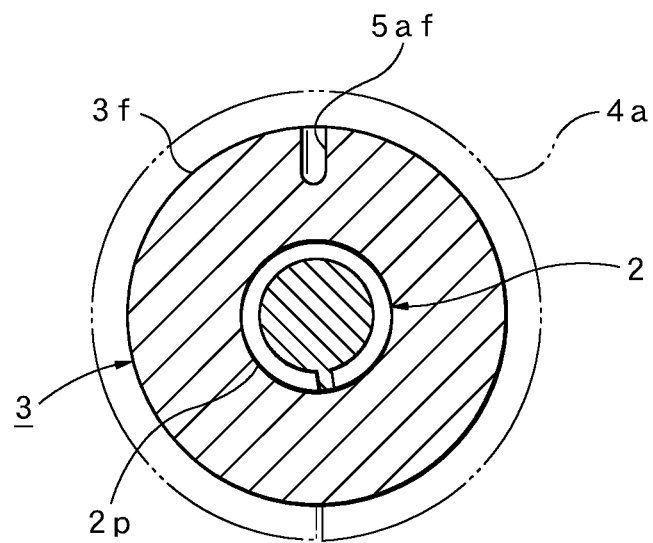
FIG. 3 is a cross-sectional view taken along the line B-B in FIG. 1.

FIG. 11 illustrates the detector attachment unit 5a configured to include three (or generally at least three or more) mounting hole sections 5af, 5ap, and 5aq . . . that can be attached to the temperature detectors 6a and 6b . . . at different selected attachment depths. Specifically, in the basic embodiment shown in FIG. 1, the case shown in FIG. 3 is one in which the upper end face of the heating cylinder 3 has a plurality (3 in the example) of 5af, 5am, and 5ar . . . having different positions along the axial direction Fs. However, the modification example shown in FIG. 11 shows a configuration in which 5ap and 5aq having different attachment depths are provided at both sides of the circumferential direction Ff with regard to 5af, for example. Specifically, when the mounting hole section 5af has an attachment depth Lm, the mounting hole section 5ap having an attachment depth Lp shallower than this attachment depth Lm is formed at a position moved away to one side in the left-and-right direction by a only predetermined width in the center direction Fc from the outer surface 3f. The mounting hole section 5aq having an attachment depth Lq deeper than the attachment depth Lm is formed at a position moved away to the other side in the left-and-right direction by only a predetermined width in the center direction Fc from the outer surface 3f.

The mounting hole section 5af in the detector attachment unit 5a has been described above. Other mounting hole sections 5am and 5ar may also be similarly provided in the detector attachment unit 5a, and other detector attachment units 5b and 5c may also be similarly provided in the detector attachment unit 5a. As described above, the detector attachment units 5a and 5b . . . include at least two or more mounting hole sections 5am, 5ap, and 5aq . . . to which the temperature detectors 6a and 6b . . . can be attached at different selected attachment depths. This can provide not only a change of the position of the control point positions Xwa . . . and Xwb . . . , but also a change of the attachment depth and a combination of a change of the position and a change of the attachment depth. This can consequently provide a more minute pattern of the inner wall face temperature distribution At, thus advantageously contributing to the higher accuracy and optimization of the temperature control.

FIG. 12 illustrates the use of a blocking body 41a . . . to fill the internal space of the mounting hole section 5af . . . by inserting the blocking body 41a . . . into each respective mounting hole section 5af . . . not being used. The use of such a blocking body 41a . . . can advantageously avoid or reduce the influence of heat radiation from the internal space of the mounting hole section 5af . . . . In this case, the material of the blocking body 41a . . . can be any material selected from various types of materials, following consideration of the heat transfer property. In the drawing, the blocking body 41a shows a case where the material of the blocking body 41a is different from that of the heating cylinder 3, while the blocking body 41b shows a case where the material of the blocking body 41b is the same as that of the heating cylinder 3. Different materials may be materials that have a lower or higher heat conductivity than that of the heating cylinder 3.

Above, the best embodiment including the modification example has been described in detail. However, the present invention is not limited to such an embodiment and can be subjected to arbitrary changes, additions, or deletions with regard to the detailed configuration, shape, material, quantity, numerical value, or method, for example, within a scope not deviating from the intention of the present invention.

For example, regarding the number of each of the mounting hole sections 5af . . . in each detector attachment unit 5a . . . , an example was shown in which the three mounting hole sections 5af . . . were provided in the axial direction Fs and three mounting hole sections 5af . . . were provided in the circumferential direction Ff. However, the number and position of each of the mounting hole sections 5af . . . may be arbitrarily determined. Thus, the mounting hole sections 5af may be provided only in the axial direction Fs, may be provided only in the circumferential direction Ff, or may be provided in a combination of the axial direction Fs and the circumferential direction Ff. The heating unit 4a . . . has been illustrated as a band heater. However, various other heating means also may be used. The temperature detector 6a . . . has been illustrated as a temperature sensor formed to have a bar-like configuration by a thermocouple. However, the temperature detector 6a . . . may be various temperature detection means based on other principles. On the other hand, the calculation formulae [formula 101], [formula 102], and [formula 103] have been illustrated as an example. Various calculation formulae may be used to convert the heating temperature Tw to the inner wall face temperature Ti. The calculation formulae are concepts including data tables for the conversion.

INDUSTRIAL APPLICABILITY

The temperature control device according to the present invention can be applied to various injection molding machines to inject, into a metal mold, molten resin plasticized by a heating cylinder to fill, with a screw, the metal mold with the resin to perform a molding operation.

The invention claimed is:

1. A temperature control device for an injection molding machine, comprising:
   a plurality of heating units attached to an outer surface of a heating cylinder and provided at a plurality of different positions of the outer surface in an axial direction of the heating cylinder, the heating cylinder including a screw;
   a plurality of detector attachment units provided at a plurality of different positions in the axial direction of the heating cylinder, corresponding to the plurality of different positions of the outer surface where the plurality of heating units are provided, wherein in each of the plurality of detector attachment units, a temperature detector is detachably attached to the outer surface of the heating cylinder and each of the plurality of detector attachment units that corresponds to a respective one of the plurality of heating units include at least two or more mounting hole sections arranged in the axial direction of the heating cylinder that can be attached to the temperature detector by selecting at least a different position in the axial direction of the heating cylinder; and
   a temperature control system for controlling, based on a heating temperature detected by each temperature detector, the plurality of heating units, so as to provide a predetermined inner wall face temperature,
   wherein the temperature control system includes a CPU programmed to perform conversion processing to convert the heating temperature detected by the temperature detector to an inner wall face temperature of the heating cylinder, and
   perform at least display processing on the inner wall face temperature obtained by the conversion processing, and
   wherein the temperature control system is further configured to:
      calculate, based on the inner wall face temperatures at the plurality of positions obtained by the conversion processing, the inner wall face temperature distribution at the inner wall face in the axial direction,
      graphically display the calculated inner wall face temperature distribution,
      graphically display set temperatures for the respective parts of the heating cylinder,
      graphically display control point positions on a graphic display of the inner wall face temperature distribution, the control point positions being attachment positions of the temperature detector that are displayed with respect, to an axial length of the heating cylinder and are superposed on display lines of the set temperatures while being associated with the inner wall face temperature distribution, and graphically display changed control point positions in relation to the set temperatures and an updated inner wall face temperature distribution after it is determined that the displayed inner wall face temperature distribution is in an inappropriate state and the conversion processing is reperformed based on the changed control point positions.

2. The temperature control device for the injection molding machine according to claim 1, wherein the plurality of detector attachment units are further provided at a plurality of different positions in the circumferential direction of the heating cylinder.

3. The temperature control device for the injection molding machine according to claim 1, wherein the at least two or more of the mounting hole sections in said each of the plurality of detector attachment unit are configured such that the temperature detector can be attached at different selected attachment depths.

4. The temperature control device for the injection molding machine according to claim 1, wherein the plurality of heating units use a band heater wound along the outer surface of the heating cylinder.

5. The temperature control device for the injection molding machine according to claim 1, wherein the temperature detector uses a temperature sensor formed to have a bar-like configuration by a thermocouple.

6. The temperature control device for the injection molding machine according to claim 1, wherein the temperature control system is configured to convert the detected heating temperature to the inner wall face temperature by using a calculation formula based on the axial direction length of the heating unit, a control point position of the heating cylinder, and the shape and material of the heating cylinder.

7. The temperature control device for the injection molding machine according to claim 6, wherein the temperature control system is configured to calculate an optimal control point position based on the calculation formula, the inner wall face temperature, and the inner wall face temperature distribution.

* * * * *